Dec. 2, 1947.  E. B. PHILLIPS ET AL  2,431,961
CENTRIFUGAL CHUCK
Filed Oct. 30, 1944  2 Sheets-Sheet 1
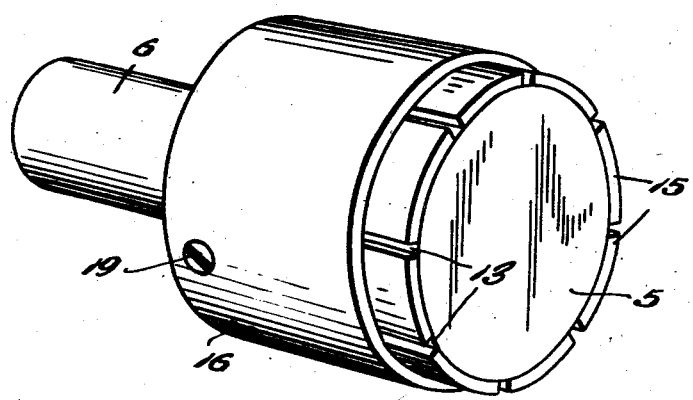
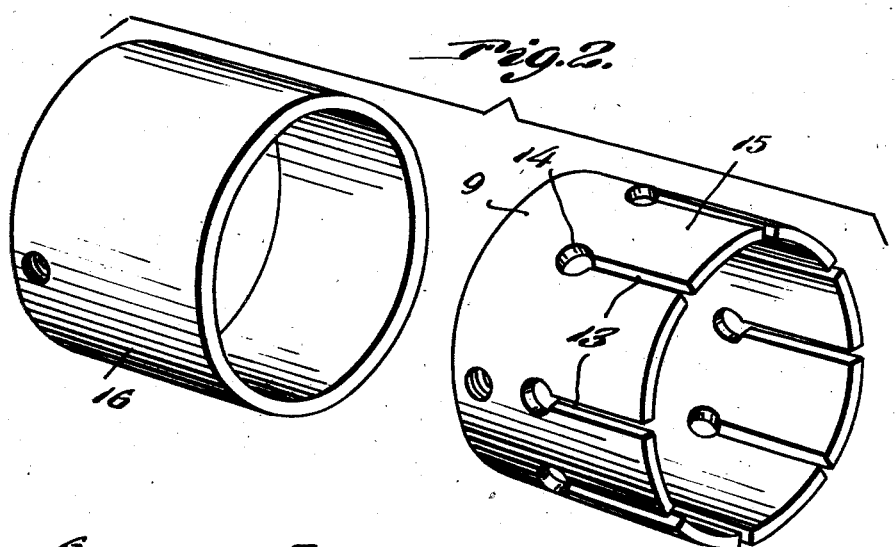
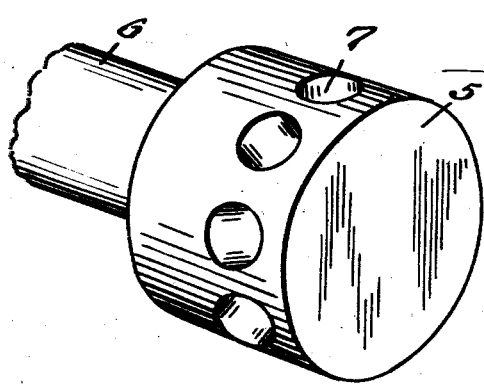
Inventors
Ernest B. Phillips
Nathaniel Berthoff
By Clarence A. O'Brien
and Harvey B. Jacobson
Attorneys Dec. 2, 1947.  E. B. PHILLIPS ET AL  2,431,961
CENTRIFUGAL CHUCK
Filed Oct. 30, 1944  2 Sheets-Sheet 2
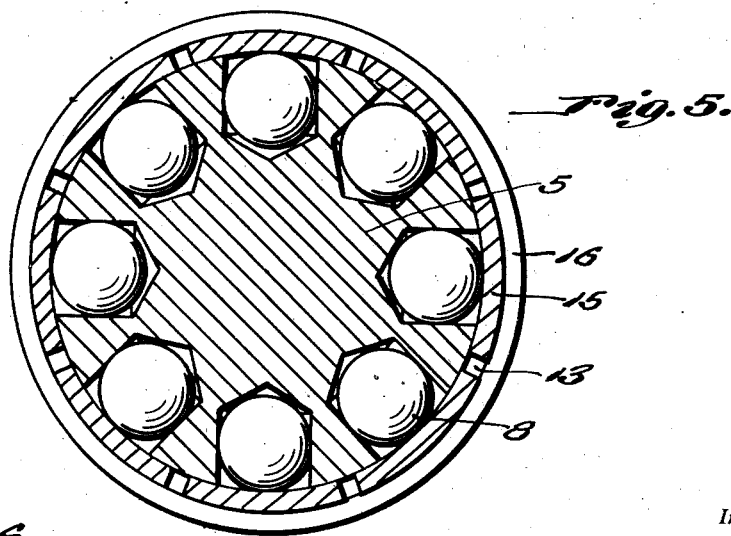
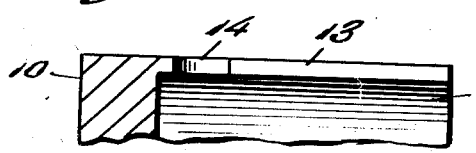

Patented Dec. 2, 1947

2,431,961

UNITED STATES PATENT OFFICE 2,431,961

CENTRIFUGAL CHUCK

Ernest B. Phillips, Lorain, and Nathaniel Berthoff, Elyria, Ohio

Application October 30, 1944, Serial No. 561,032

2 Claims. (Cl. 279—2)

1

The present invention relates to new and useful improvements in chucks adapted for light machining operation, such as the hand burring, sanding, polishing, etc., of metal parts and has for its primary object to provide centrifugally actuated means for securing the work in position on the chuck.

More specifically the invention embodies the provision of a plurality of steel balls loosely carried in recesses in the sides of the chuck and adapted through centrifugal action to engage and expand a split shell carried by the chuck so as to exert sufficient force to frictionally hold the work on the expanded shell and automatically releasing the work with the stoppage of the chuck.

A further object of the invention is to provide a device of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view showing the assembled chuck.

Figure 2 is a group perspective view of the expansible shell and stop shell enclosing the expansible shell.

Figure 3 is a perspective view of the chuck.

Figure 4 is a longitudinal sectional view through the assembled chuck.

Figure 5 is a transverse sectional view taken substantially on a line 5—5 of Figure 4, and Figure 6 is a fragmentary longitudinal sectional view through the expansible shell.

Referring now to the drawings in detail wherein for the purpose of illustration we have disclosed a preferred embodiment of the invention, the numeral 5 designates a substantially cylindrical chuck head formed on a stem 6 by means of which the chuck is attached to the machine.

The chuck 5 is formed adjacent its outer end with a plurality of radially extending recesses 7 in which steel balls 8 are loosely positioned.

Mounted on the chuck 5 is an expansible shell 9 having an inner end wall 10 provided with an

2 opening 11 for receiving the stem 6 and secured thereto by a set screw 12. The outer end of the shell 9 is formed with a plurality of longitudinally extending slots 13 terminating in openings 14 at the inner ends thereof and forming a plurality of spring fingers 15 at the outer end of the shell.

A stop shell 16 encloses the inner end of the shell 9 and is likewise formed with an inner end wall 17 having an opening 18 for receiving the stem 6 and secured to the stem by a set screw 19. The outer end of the stop shell 16 terminates inwardly of the outer ends of the expansible shell 9 whereby to permit expansion of the outer ends of the spring fingers 15.

In the operation of the device the work is placed over the expansible shell 9 at the portion thereof projecting outwardly from the stop shell 16, the outer end of the stop shell 16 limiting the inward movement of the work on the shell 9.

When the chuck 5 is rapidly rotated the steel balls 8 will be thrown outwardly by centrifugal action against the inside of the spring fingers 15 whereby to cause an expansion thereof for frictional gripping engagement with the inside of the work positioned thereon and thus securely hold the work in position on the chuck for the light machining thereof. When the chuck 5 is stopped the centrifugal force produced by the steel balls will be released thus permitting removal of the work from the chuck.

It is believed that the details of construction and manner of use of the device will be readily understood from the foregoing without further explanation.

Having thus described the invention, what we claim is:

1. A chuck having a plurality of radial recesses therein, weighted balls freely positioned in said recesses, a shell secured to the chuck and having a plurality of longitudinally extending slots in one end thereof to provide spring fingers thereon, said spring fingers closing said recesses and subjected to the centrifugal force of said balls during the rotation of the chuck to expand said fingers, and a stop adjustably secured on said shell.

2. A chuck having a plurality of radial recesses therein, weighted balls freely positioned in said recesses, a shell secured to the chuck and having a plurality of longitudinally extending slots in one end thereof to provide spring fingers thereon, said spring fingers closing said recesses and subjected to the centrifugal force of said balls during the rotation of the chuck to expand said fingers, and a stop shell adjustably secured on said first-named shell.

ERNEST B. PHILLIPS.
    NATHANIEL BERTHOFF.

REFERENCES CITED

The following references are of record in the file of this patent:

UNITED STATES PATENTS

| Number | Name | Date |
| --- | --- | --- |
| 1,464,551 | Urquhart | Aug. 14, 1923 |
| 1,312,628 | Gydesen | Aug. 12, 1919 |
| 1,431,761 | Schlaupitz | Oct. 10, 1922 |
| 2,101,790 | Cole et al. | Dec. 7, 1937 |
| 2,408,503 | Young | Oct. 1, 1946 |

FOREIGN PATENTS

| Number | Country | Date |
| --- | --- | --- |
| 120,134 | Great Britain | 1918 |